US007380086B2

(12) United States Patent
Archambault et al.

(10) Patent No.: US 7,380,086 B2
(45) Date of Patent: May 27, 2008

(54) SCALABLE RUNTIME SYSTEM FOR GLOBAL ADDRESS SPACE LANGUAGES ON SHARED AND DISTRIBUTED MEMORY MACHINES

(75) Inventors: Roch Archambault, North York (CA); Anthony Simon Bolmarcich, Carmel, NY (US); G. Calin Cascaval, Carmel, NY (US); Siddhartha Chatterjee, Yorktown Heights, NY (US); Maria Eleftheriou, Mt. Kisco, NY (US); Raymond Mak, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 10/734,690

(22) Filed: Dec. 12, 2003

(65) Prior Publication Data
US 2005/0149903 A1 Jul. 7, 2005

(51) Int. Cl.
*G06F 12/00* (2006.01)
*G06F 9/45* (2006.01)
*G06F 9/46* (2006.01)

(52) U.S. Cl. .............. 711/170; 711/147; 711/173; 711/202; 717/140; 717/149; 717/151; 718/104

(58) Field of Classification Search ............. None
See application file for complete search history.

(56) References Cited

U.S. PATENT DOCUMENTS

| | | | | |
|---|---|---|---|---|
| 5,129,084 A | * | 7/1992 | Kelly et al. ............ | 718/104 |
| 5,598,562 A | * | 1/1997 | Cutler et al. ........... | 718/104 |
| 5,692,193 A | * | 11/1997 | Jagannathan et al. ...... | 718/106 |
| 5,727,209 A | * | 3/1998 | Slingwine et al. ......... | 718/102 |
| 5,862,376 A | * | 1/1999 | Steele et al. ............ | 718/107 |
| 6,047,295 A | * | 4/2000 | Endicott et al. .......... | 707/206 |
| 6,466,898 B1 | * | 10/2002 | Chan ................... | 703/17 |
| 6,654,773 B2 | * | 11/2003 | Hills .................. | 707/206 |
| 6,711,595 B1 | * | 3/2004 | Anantharao ............. | 707/206 |
| 6,842,901 B1 | * | 1/2005 | Miller ................. | 718/104 |
| 6,925,637 B2 | * | 8/2005 | Thomas et al. .......... | 717/151 |
| 2001/0042188 A1 | * | 11/2001 | Tremblay et al. ......... | 712/11 |
| 2002/0120640 A1 | * | 8/2002 | Hills .................. | 707/206 |
| 2002/0129079 A1 | * | 9/2002 | Long et al. ............ | 709/100 |

OTHER PUBLICATIONS

Andrew S. Tanenbaum and Maarten van Steen, Distributed Systems: Principles and Paradigms, Sep. 26, 2001, Prentice Hall, pp. 16-17 and 292-293.*

* cited by examiner

*Primary Examiner*—Reginald G. Bragdon
*Assistant Examiner*—Shawn X. Gu
(74) *Attorney, Agent, or Firm*—Michael J. Buchenhorner; Douglas W. Cameron

(57) ABSTRACT

An improved scalability runtime system for a global address space language running on a distributed or shared memory machine uses a directory of shared variables having a data structure for tracking shared variable information that is shared by a plurality of program threads. Allocation and de-allocation routines are used to allocate and de-allocate shared variable entries in the directory of shared variables. Different routines can be used to access different types of shared data. A control structure is used to control access to the shared data such that all threads can access the data at any time. Since all threads see the same objects, synchronization issues are eliminated. In addition, the improved efficiency of the data sharing allows the number of program threads to be vastly increased.

8 Claims, 4 Drawing Sheets

SCALABLE RUNTIME SYSTEM FOR GLOBAL ADDRESS SPACE LANGUAGES ON SHARED AND DISTRIBUTED MEMORY MACHINES

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing. More particularly, the present invention relates to a scalable runtime system for a global address space computer language for use on a shared or distributed memory machine.

BACKGROUND OF THE INVENTION

Global address space (GAS) languages provide a shared memory programming model abstraction that can be implemented on machines that do not provide shared memory. Examples of such languages are UPC, Co-Array Fortran and Titanium. UPC extends the ANSI C language with constructs for manipulating shared memory variables, thread synchronization operations such as locks and barriers and strict and relaxed memory consistency models. The UPC language can be implemented on different architectures having shared memory, distributed memory or a combination of the two. However, existing implementations can not be scaled to operate above 64-256 threads. Therefore, a global address language that can operate on a shared or distributed memory system having more than 256 threads is needed.

UPC programs consist of virtual threads that map to physical processors in some fashion. The threads are synchronized through barriers or locks. The threads access memory in a global address space. The threads can access memory either privately or shared. Shared objects have affinity to threads. Private memory can be accessed only by the owning thread. The parallel programming model is in accordance with one of two consistency models. A strict model that obeys the sequential consistency rules and a relaxed model in which threads see changes to shared data made by other threads only at synchronization points. Furthermore, the relaxed model may only be implemented if the underlying architecture actually supports such a model.

SUMMARY OF THE INVENTION

An embodiment of the present invention is directed toward a runtime system for a global address space language for use with a plurality of processors or computers. The runtime system includes a directory of shared variables having a data structure for tracking shared variable information that is shared by a plurality of program threads. Allocation and de-allocation routines allocate and de-allocate shared variable entries in the directory of shared variables. The allocation and de-allocation routines preferably use pair-to-pair synchronization which improves the scalability. In addition, the allocation and de-allocation routines are preferably used for both statically and dynamically allocated data. The runtime system may be implemented on a distributed memory system and store the directory of shared variables in a private memory of each thread such that it is replicated across all of the threads. The runtime system may also be implemented on a shared memory system and store the directory of shared variables in a shared memory shared by all threads. Arrays that are dynamically allocated have affinity to a thread that called the allocation or de-allocation routine. Every thread contains handles to the accessible shared variables and the entries in the directory of shared variables are accessed using these handles. The handle has a partition index and a variable index. Each thread has exclusive write access rights to a partition of the directory of shared variables associated with the thread.

Yet another embodiment of the present invention is directed toward a runtime system that scales to a plurality of processors for a global address space language program that has a plurality of program threads that access memory in a global address space system. The runtime system has a shared data directory that maintains shared data entries related to shared data structures that are shared by more than one of the plurality of threads. The shared data directory includes a partition that is used to access all statically declared non-scalar variables. Each thread uses a mutually exclusive partition of the shared data directory. Control structures are used to access, allocate and de-allocate the shared data structures through the shared data directory. The plurality of processors may operate as a shared memory machine or a distributed memory machine. The shared data structures have affinity to particular threads and may include shared scalar variables, objects, arrays or pointers. A shared scalar variable is accessed by dereferencing a shared data directory partition for which the shared scalar variable has affinity. A shared array has a shared data directory partition that points to a control structure that in turn points to the shared array. A control harness is allocated for a shared pointer when the shared pointer is declared by allocating a shared control block and a shared address structure. Some of the shared pointers have shared targets and some of the shared pointers have private targets. The entries to the shared data directory are allocated by an owning thread or, in a synchronized manner, by all threads at the same time. A handle that includes a partition index and a variable index is used by the threads to access the shared variables.

Yet another application of the present invention is directed toward a method of providing a scalable runtime system for a global address space language. According to the method, a directory of shared variables is created containing information related to data shared by program threads for use by the threads in accessing the shared data. Control structures are created to control allocation and de-allocation of the shared data. A plurality of control structures are preferably created wherein each control structure controls the allocation and de-allocation of a particular type of shared data structure. The method may be operated on a distributed memory machine. In such an embodiment, each thread contains a private copy of the directory of shared variables and a calling thread allocates an entry in its directory of shared variables and broadcasts an index of the entry to other threads. Each thread also has a private data control structure with a pointer to a shared memory fraction. In a shared memory machine, a calling thread allocates space for a shared variable and inserts a handle in a partition in the directory of shared variables. The control structures are common in that any thread can access the control structures.

DETAILED DESCRIPTION

The present invention solves the scalability problem of global address space (GAS) languages by utilizing a layered approach wherein a compiler parses the global address space code and transforms the global address space language constructs into calls to a scalable runtime system. The runtime system consists of a set of data structures and functions that operate on these data structures. The runtime system implements the global address space language semantics on top of the hardware and operating system primitives. The interface exposed by the runtime system is applicable to both shared and distributed memory machines. While the embodiments of the invention discussed below are directed toward the UPC global address space language, it can be readily applied to all global address space and similar languages.

Figure 1:
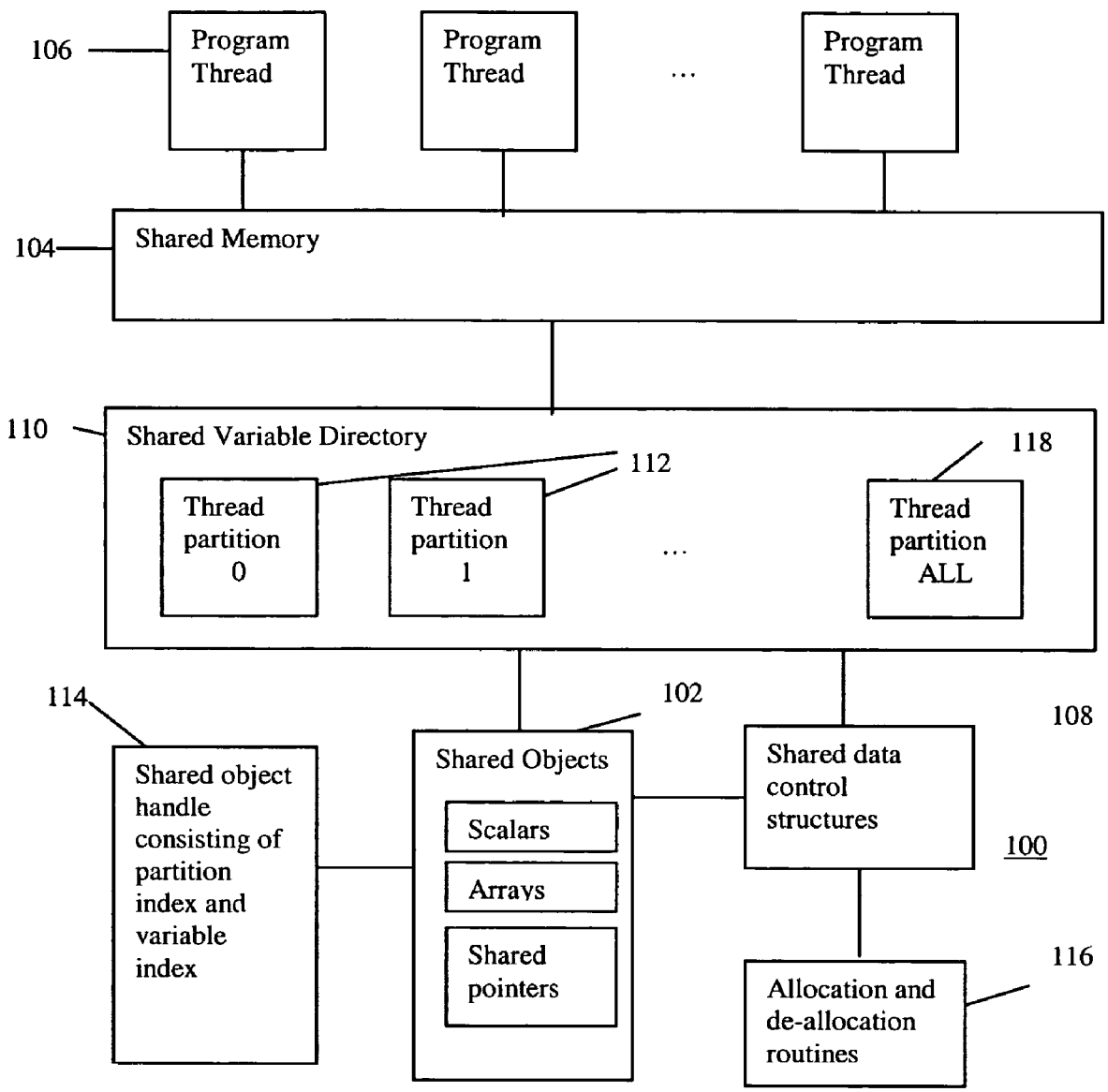
FIG. 1 is a block diagram of components of a runtime system for a global address language that is scalable to a large number of processors.

Referring now to FIG. 1, there is shown a block diagram of the preferred system components for implementing an embodiment of the present invention. Shared objects 102 are objects that reside in a shared portion of the address space 104 and are, therefore, accessible by all of the program threads 106 in a program. The runtime system 100 recognizes different kinds of shared objects 102 such as shared scalars, shared structures/unions/enumerations, shared arrays, and shared pointers with shared targets and private targets. The runtime system 100 maintains various control structures 108, which in conjunction with the directory of shared variables 110 enables the threads 106 to access these shared objects 102. The single entry point to access shared data 102 is an opaque handle type 114. Therefore, corresponding to every shared object 102 in the program, each thread 106 at runtime contains a variable of a particular type. The handles 114 are kept internally by the runtime system 100 in a directory of shared variables 110, which is partitioned on per-thread partitions 112 for scalability reasons. The runtime system 100 provides routines 116 for initializing and manipulating these handles 114 and the control data structures 108. The compiler generates the appropriate calls to these routines 116 for the shared objects 102 defined in a compilation unit. Additionally, the runtime system exposes the control data structures 108 to the compiler to facilitate access to unnamed shared data. This mechanism is needed for data such as the elements of a shared array that contains shared pointers or auto scoped private pointers to shared data. Instead of allocating a handle for each element in the array, the compiler uses the control data structures 108 directly, rather than going through the directory of shared variables. It should be noted that the only information that the runtime system 100 maintains about the base type of a shared object is the size in bytes of that type. This information is necessary for correct handling of arithmetic and dereferencing of shared pointers.

One attribute of the shared objects is affinity. An affinity value indicates the thread to which the shared object has affinity. The language semantics strictly define the affinity of shared objects. In the UPC language, the affinity attribute takes a value from 0 to the number of threads. The affinity is defined according to a set of rules. First, statically declared non-array shared variables, and statically declared arrays with an indefinite block size, have an affinity value of zero. Second, statically declared arrays have an affinity to all threads in a program as do arrays that are dynamically allocated using the upc_all_alloc_routine. Finally, arrays that are dynamically allocated have affinity to the thread that called the routine. Note that most of the affinity values that are non-zero cannot be determined until the program has begun execution, because the number of threads may not be known until execution time. The runtime system infers the affinity value from the routine used to initialize or allocate the shared variable and the compiler is not required to provide this value as an argument.

The directory of shared variables 110 is a partitioned data structure that the runtime system 100 uses to manage allocation, de-allocation, and access to shared variables 102. It is designed to scale to a large number of threads 106 while allowing efficient manipulation of shared data. The directory of shared variables 110 logically consists of a two-level data structure. At the first level there is array with THREADS+1 entries where THREADS is a constant defined in the global address space language such as UPC that is typically equal to the number of program threads in the system. Each element of a partition 112 stores handles to shared variables 114 that have affinity to the thread associated with the partition number. One of the partitions 118, which is referred to as the ALL partition in our runtime system, is used for all statically declared shared non-scalar variables. This separation of the directory of shared variables 110 is chosen because the ALL partition 118 has a fixed size while the other partitions 112 are resized as threads 106 allocate shared data dynamically.

Each different thread 106 uses a mutually exclusive partition 112 of the directory of shared variables 110. Each partition 112 is an independent, resizable array of pointers to control structures, such that, if one thread 106 declares a large number of shared variables 102, only its associated partition 112 will grow. Directory of shared variables 110 entries are accessed using handles 114. Preferably, the handle type consists of a partition index and a variable index within the partition. Both of these are managed by the runtime system 100 transparently for the compiler.

Physically, the directory of shared variables 110 is kept in shared memory for shared memory machines. The partitions 112 are stored with affinity to the owning thread 106. Since the directory of shared variables 110 is not exposed to the compiler user, atomic access rules apply. For distributed memory machines, the directory of shared variables is kept in the private memory of each thread and it is replicated across all threads. Because most of the operations of the directory of shared variables will be global operations in which all threads participate, each thread's copy of the directory of shared variables can be updated without communication in a consistent atomic manner. Communication is required in the case of non-global operations. However, even in such a case, the communication is non-blocking as the preferred design of the shared variable table guarantees that only one thread has write access rights to its directory of shared variables partition.

Figure 2:
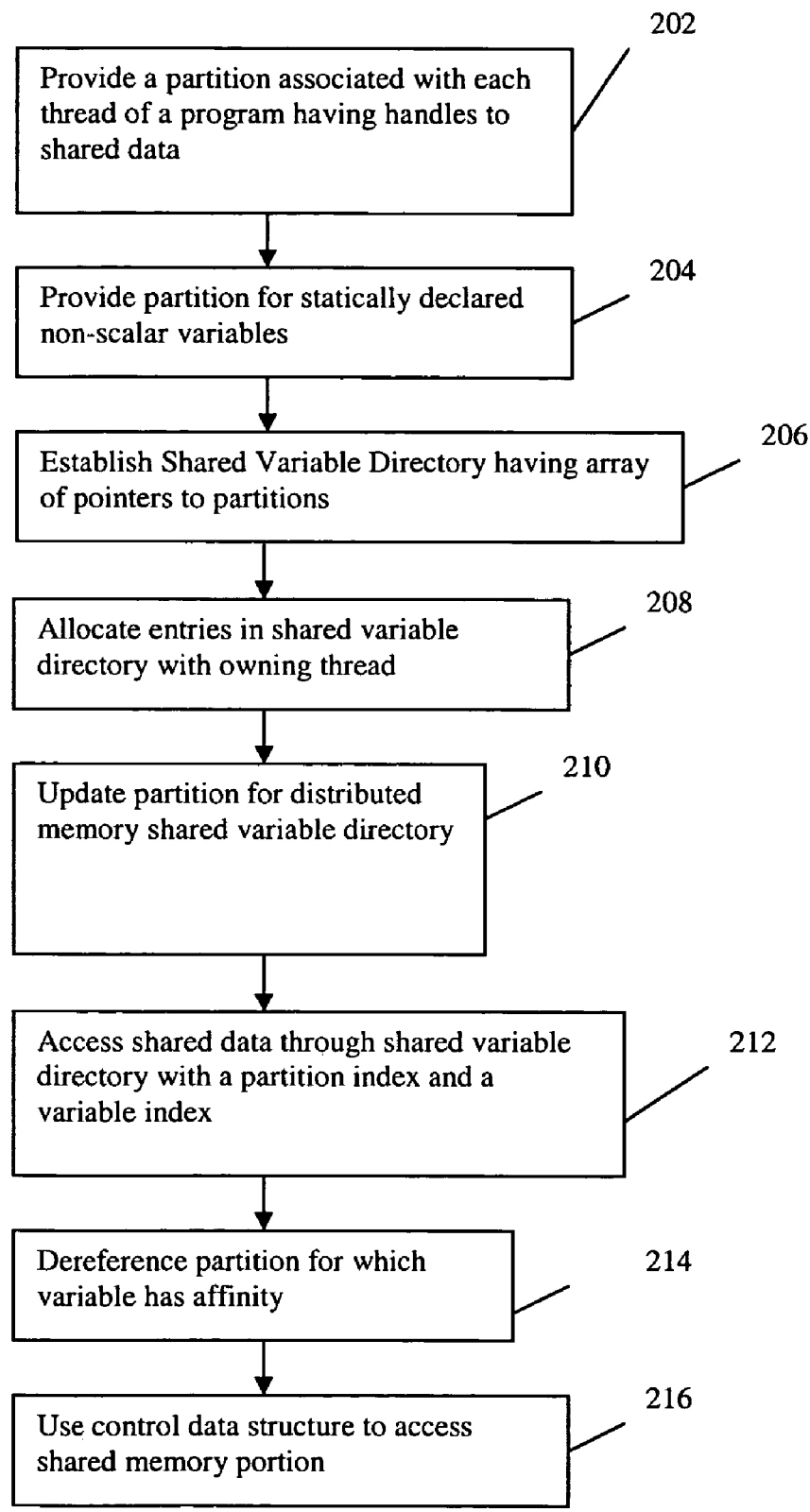
FIG. 2 is flow chart of a method for making a runtime system for a global address language more scalable.

Referring now to FIG. 2, a method of creating a scalable runtime system for a global address space language is shown. The method begins in step 202 with the providing of a partition associated with each thread of a program having handles to shared data. A partition is also provided for statically declared non-scalar variables in step 204. A directory of shared variables having an array of pointers to the partitions is established in step 206. To create shared variables, program threads allocate entries in the directory of shared variables in step 208. Since the owning thread allocates the entries, there is no need to synchronize the allocation on a shared memory configuration. In step 210, on a distributed memory machine, the directory of shared variables partitions are updated in a consistent manner. In step 212, the shared data is accessed through the directory of shared variables with a partition index and a variable index. When a thread calls on a variable, the partition for which the variable has affinity is dereferenced as set forth in step 214. Once the partition is dereferenced, a control data structure is used to access the shared memory portion as set forth in step 216.

Shared data is preferably accessed through the directory of shared variables in a different manner for each type of shared variable: scalar, array and shared pointer with a shared or private target. To access a shared scalar with a given handle, the thread requesting access dereferences the directory of shared variables partition for which the variable has affinity. Dereferencing a shared scalar handle returns the control data structure that has a pointer to the allocated scalar.

Figure 3:
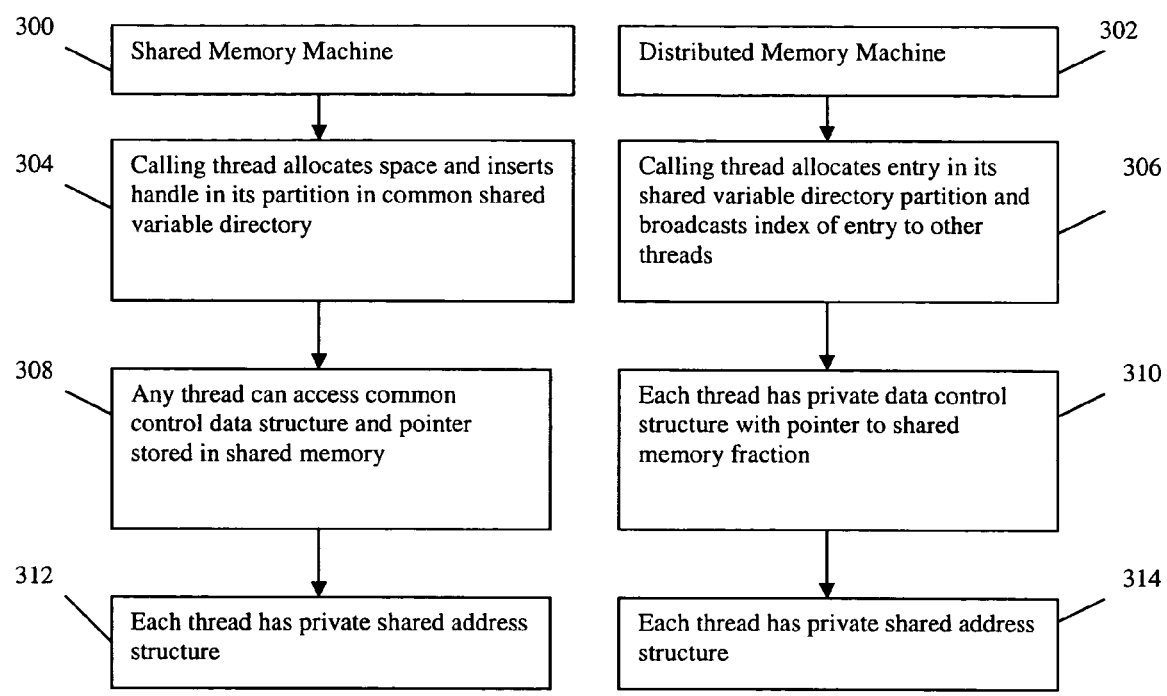
FIG. 3 is a block diagram of alternative embodiments of the present invention for use with shared memory machines and distributed memory systems.

The shared variable or data directory can be adapted to create a scalable runtime system for either a shared memory 300 or a distributed memory machine 302 or network as set forth in FIG. 3. For the shared memory machine 300, the calling thread allocates space and inserts a handle in its partition in a common directory of shared variables as shown in step 304. Thus, on a shared memory machine 300, any thread can directly access the control data structure and the pointer. For the distributed memory machine 302, the calling thread allocates an entry in its directory of shared variables partition and broadcasts the index of the entry to other threads in the program in step 306. Thus, on a distributed memory machine 302, the accessing thread has a private control data structure that has a pointer to the shared memory fraction owned by the thread to which the scalar has affinity. The accessing thread will send a message to the affinity thread with the scalar's address to obtain the value. Optimizations such as caching the values of shared variables, the addresses of shared objects, etc. can be utilized as desired. A shared structure is accessed in a similar fashion to a shared scalar, except that the allocated space is a block of memory the size of the structure. The directory of shared variables of a shared array points to a shared variable control block that in turn points to a shared array structure. On a shared memory machine, there is one copy of the structure that points to the allocated shared array. On a distributed memory machine, each thread has a copy of the shared variable control block that points to a shared array which in turn points to the locally allocated part of the shared array. The shared array structure contains enough information such that each thread can locally compute the affinity of every element in the array.

When declaring a shared pointer, the runtime system will allocate the control harness for the shared pointer, i.e. the shared variable control block structure and the shared address structure. The handle field of the shared address structure is not initialized. In order to respect the C semantics of pointers being equivalent to arrays, the handle field, when initialized, will point to a shared array handle. With respect to the shared memory machine 300, any thread can access a common control data structure and pointer stored in shared memory 308. However, as shown in step 310, in the distributed memory machine 302, each thread has private data control structure with a pointer to a shared memory fraction. On a shared memory machine 300, the control block is stored in shared memory, while on a distributed memory machine 302, the control block is replicated on all threads. The shared address structure is private to threads on both shared and distributed memory machines as shown in steps 312 and 314.

One major limiting factor with respect to the scalability of current implementations of global address languages is the fact that the threads are mapped to processes and each thread has to map the entire memory space at the same virtual address such that static data are implicitly shared by virtue of being located at the same address on all threads. A preferred embodiment of the present invention overcomes this problem by using a directory of shared variables wherein the threads map to the directory and by providing routines for the allocation and de-allocation of the shared objects such that the objects are more efficiently shared as described above. Therefore, the preferred embodiment is a substantial improvement upon the prior art.

Global address space languages such as UPC provide routines for dynamically allocating data. These routines require synchronization/communication between threads. However, synchronization can be difficult to perform in a distributed memory system if the messages are not guaranteed to arrive in order. A preferred embodiment of the present invention resolves this problem by partitioning the directory of shared variables as described above. Essentially, message ordering is not a problem because operations are atomic in that any thread can address the shared variable and a change by one thread functions as a change for all threads. This is achieved by keeping the directory of shared variables consistent such that indices in the directory of shared variables partitions are either allocated by the owning thread or in a synchronized manner by all threads at the same time for the common partition. A control structure allocates shared memory on all threads with affinity to the calling thread. On a shared memory machine, the calling thread allocates space in the shared memory and inserts the handle in its partition in the common directory of shared variables. In a distributed memory machine, the calling thread allocates an entry in its directory of shared variables partition and broadcasts the index of this entry to all the other threads at the same time with the request for allocation. The other threads allocate the memory and update the given index in the calling thread partition. Since the directory is updated at the time of the request atomically, no extra synchronization is necessary.

A preferred embodiment of the present invention uses different allocation and de-allocation routines to allocate the shared memory depending upon the type of object being allocated. A common allocation routine is used to allocate shared memory on all threads with affinity to the partition of the directory of shared variables set aside for statically declared non-scalar variables. Since this is a collective operation, all threads must execute it and, therefore, the consistency of the partition is preserved because all threads will obtain the same index in the partition. A local allocation routine allocates shared memory on the calling thread with affinity to the calling thread. The calling thread allocates a new index in its directory of shared variables partition and updates the entry point to the newly allocated data. The other threads' shared variable directories are up-dated on-demand when the thread accesses the data, if the data is truly shared. De-allocation works in a similar fashion, either all threads execute the de-allocation routine and update the common partition in a consistent manner, or the thread to which the data has affinity updates its partition atomically.

Figure 4:
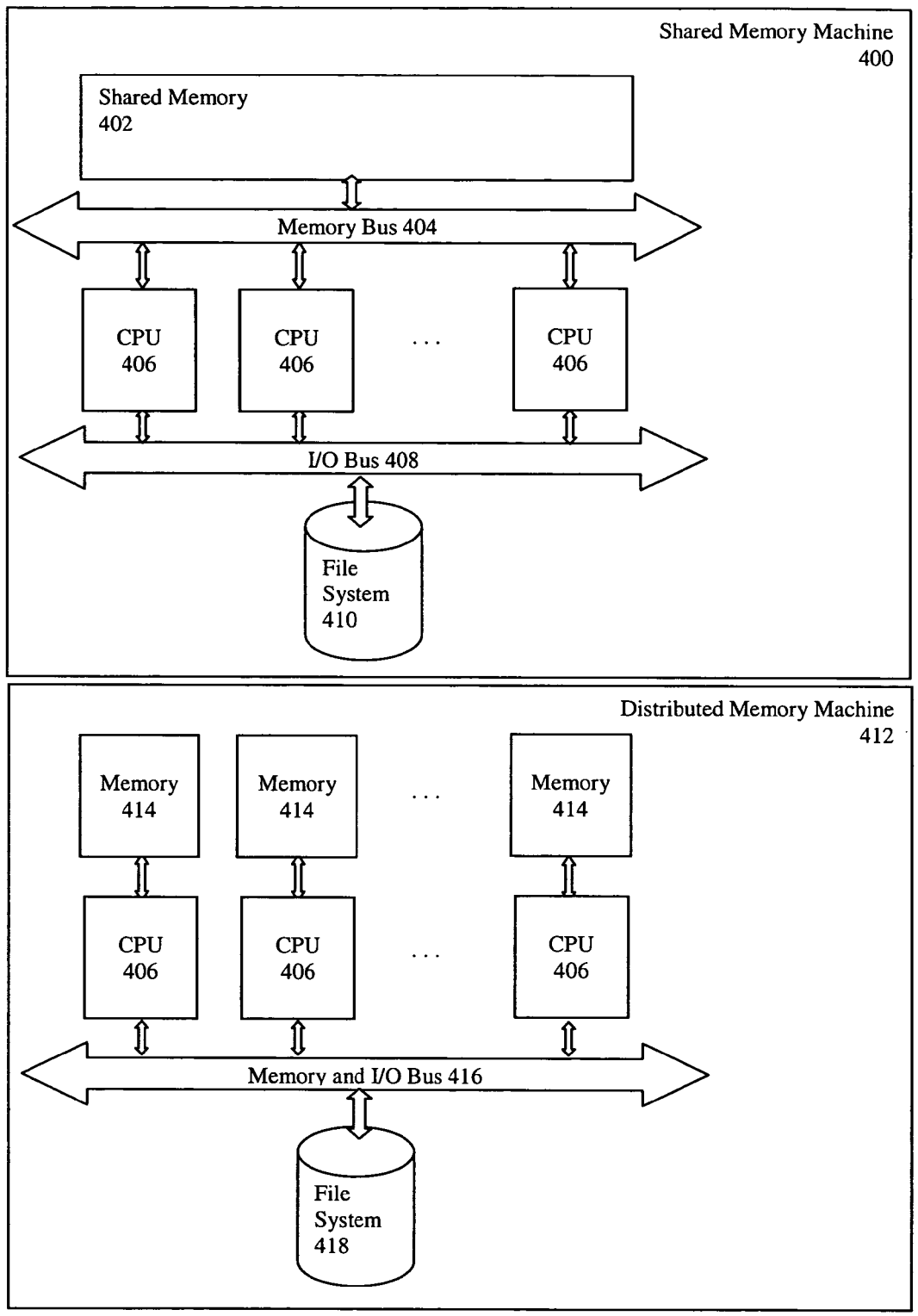
FIG. 4 is an illustration of a computer system for implementing an embodiment of the present invention.

Referring now to FIG. 4, a block diagram of an information handling system that can be used to implement an embodiment of the present invention is shown. A shared memory system 400 consists of a number of central processing units (CPU) 406 connected to a memory bus 404 and share the memory 402. The CPUs 406 are also connected through an I/O bus 408 to a file system 410. In a distributed memory system 412 the CPUs 406 are each connected to their own, private memories 414. In this system the global address space is realized by the CPUs making their private memory accessible by other CPUs through the Memory and I/O bus 416. The bus 416 also connects the CPUs to the file system 418. The performance and scalability of such as system is enhanced by the preferred embodiments.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

We claim:

1. A method of providing a scalable runtime system, the method comprising:

running a global address space language program comprising a plurality of program threads;

creating a directory of shared variables, for locating and managing shared objects, the directory containing information concerning data shared by the program threads for use by the threads in accessing the shared data and entries acting as object identifiers, providing a level of address translation between a compiler and the runtime system; and creating control structures to control allocation and de-allocation of the shared data;

implementing a private memory of each thread, the private memory comprising a replica of the directory of shared variables such that said directory is replicated across all of the threads.

2. The method of claim 1 wherein creating control structures comprises creating a plurality of control structures wherein each control structure controls the allocation and de-allocation of a particular type of shared data structure.

3. The method of claim 1 comprising operating the runtime system on a distributed memory machine.

4. The method of claim 3 wherein each thread contains a private copy of the directory of shared variables and a calling thread allocates an entry in its directory of shared variables and broadcasts an index of the entry to other threads.

5. The method of claim 3 wherein each thread has a private data control structure with a pointer to a shared memory fraction.

6. The method of claim 1 comprising operating the runtime system on a shared memory machine.

7. The method of claim 6 wherein the control structures are common such that any thread can access the common control structures.

8. The method of claim 1 wherein a calling thread allocates space for a shared variable and inserts a handle in a partition in the directory of shared variables.

* * * * *